US008812626B2

(12) United States Patent
Colombo et al.

(10) Patent No.: US 8,812,626 B2
(45) Date of Patent: Aug. 19, 2014

(54) INTERACTION METHOD BETWEEN SERVICE-ORIENTED COMPONENTS

(75) Inventors: Armando Walter Colombo, Karlstein (DE); Joao Marco Mendes, Ponte de Lima (PT)

(73) Assignee: Schneider Electric Automation GmbH, Seligenstadt (DE)

( * ) Notice: Subject to any disclaimer, the term of this patent is extended or adjusted under 35 U.S.C. 154(b) by 1024 days.

(21) Appl. No.: 12/919,805

(22) PCT Filed: Feb. 27, 2009

(86) PCT No.: PCT/EP2009/052356
§ 371 (c)(1),
(2), (4) Date: Nov. 10, 2010

(87) PCT Pub. No.: WO2009/106606
PCT Pub. Date: Sep. 3, 2009

(65) Prior Publication Data
US 2011/0060787 A1 Mar. 10, 2011

(30) Foreign Application Priority Data
Feb. 29, 2008 (DE) .................. 10 2008 002 787

(51) Int. Cl.
*H04L 29/08* (2006.01)
*G06F 9/54* (2006.01)
*G06F 17/00* (2006.01)

(52) U.S. Cl.
CPC ............ *H04L 67/16* (2013.01); *H04L 67/143* (2013.01); *H04L 67/141* (2013.01); *H04L 67/142* (2013.01); *H04L 67/14* (2013.01); *G06F 9/54* (2013.01)
USPC .......... 709/220; 709/217; 709/218; 709/219; 709/227; 709/229

(58) Field of Classification Search
CPC ..... H04L 67/14; H04L 67/141; H04L 67/142; H04L 67/143; H04L 67/16; G06F 9/54
USPC .................. 709/217–220, 227–229
See application file for complete search history.

(56) References Cited

U.S. PATENT DOCUMENTS 5,598,541 A * 1/1997 Malladi .................. 710/106
7,151,966 B1 12/2006 Baier et al.
7,996,562 B2 * 8/2011 Holdsworth ............ 709/245

(Continued)

OTHER PUBLICATIONS

Migliardi et al "Standards Based Heterogeneous Metacomputing: The Design of Harness II" IEEE Comput., Apr. 2001, pp. 84-96.

(Continued)

*Primary Examiner* — Alina N Boutah
(74) *Attorney, Agent, or Firm* — Ladas & Parry LLP

(57) ABSTRACT

An interaction method between service-oriented components and devices, where services offered by a service-provider are requested by a service-requester. In order to broaden flexibility and to simplify reconfiguration of the system, each service includes a set of ports and each port is an instance of a port-type that defines a set of interaction operations and corresponding message transfers between the service-provider and service-requester. The service provided by the service-provider is carried out in several interaction phases with the service-requester, and the interaction phases follow the specific protocols linked to the instances of port-type and the service is accessed by a sequence of different ports that are linked to the phases.

5 Claims, 3 Drawing Sheets

(56) References Cited

U.S. PATENT DOCUMENTS

Figure 1:
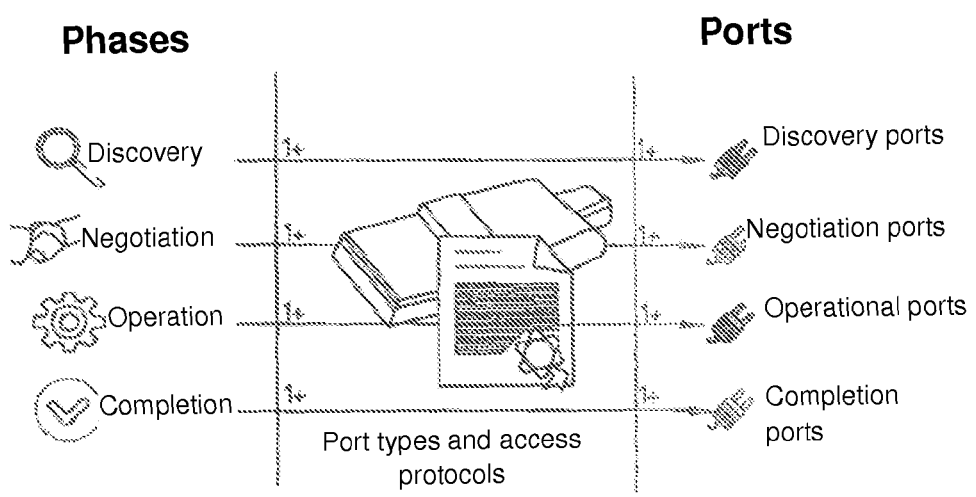

| | | | |
|---|---|---|---|
| 2004/0111525 A1* | 6/2004 | Berkland et al. | 709/231 |
| 2004/0139151 A1* | 7/2004 | Flurry et al. | 709/203 |
| 2005/0128304 A1* | 6/2005 | Manasseh et al. | 348/207.99 |
| 2006/0069717 A1* | 3/2006 | Mamou et al. | 709/203 |
| 2006/0136600 A1* | 6/2006 | Holdsworth | 709/245 |
| 2006/0168646 A1* | 7/2006 | Werner | 726/4 |
| 2007/0005777 A1* | 1/2007 | Fremantle et al. | 709/228 |
| 2007/0266035 A1* | 11/2007 | Hays et al. | 707/10 |
| 2008/0120348 A1* | 5/2008 | Field et al. | 707/201 |
| 2008/0140835 A1* | 6/2008 | Bradley et al. | 709/225 |

OTHER PUBLICATIONS

Benjamins et al "Web Services: Been There, Done That?", IEEE In. Systems, Jan. 2003, pp. 72-85.

Helal et al "The Internet Enterprise" IEEE Comput., Jan. 2002, pp. 54-62.

Jammes et al "Orchestration of Service-Oriented Manufacturing Processes" IEEE, Sep. 2005, pp. 617,624.

* cited by examiner

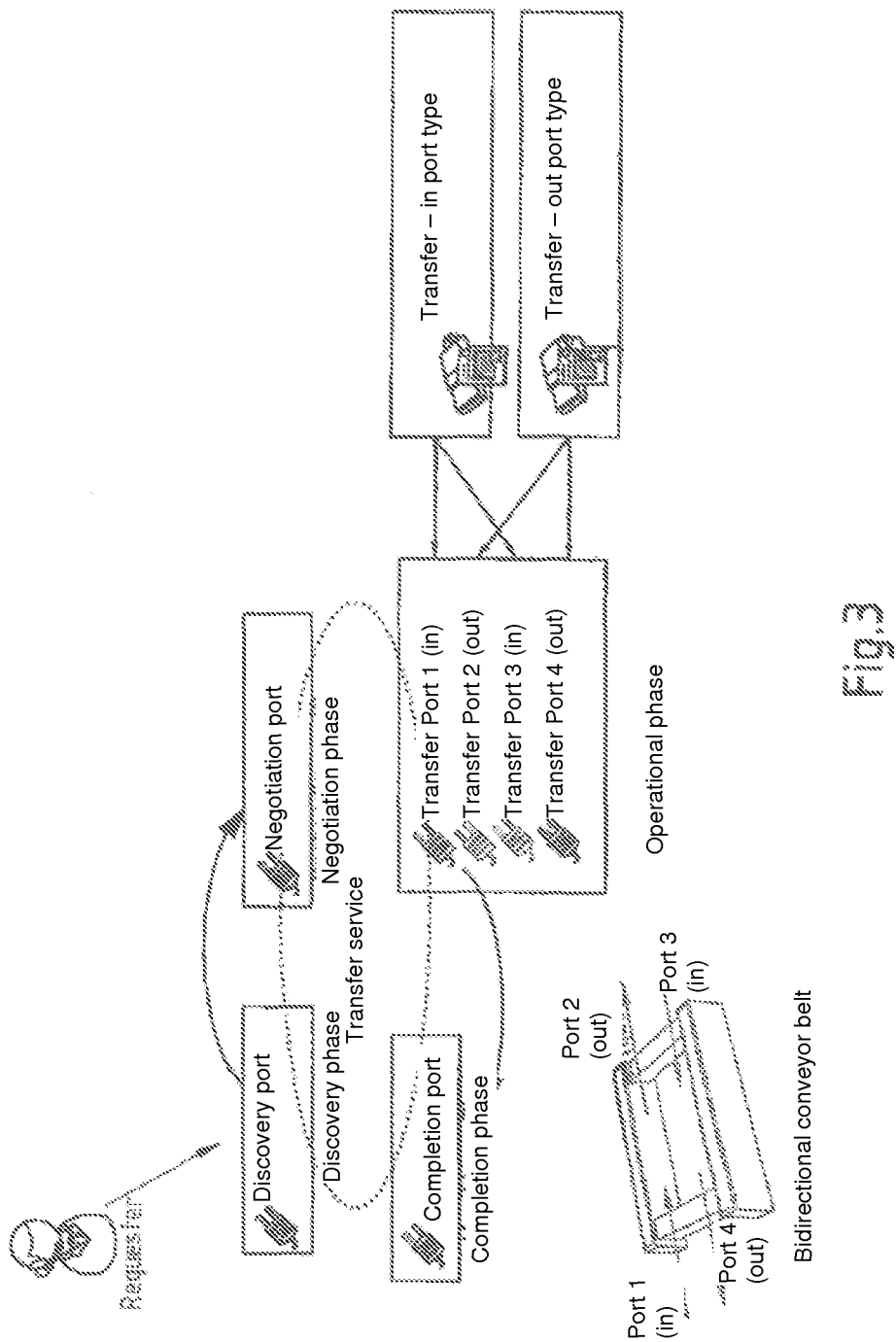

INTERACTION METHOD BETWEEN SERVICE-ORIENTED COMPONENTS

The invention relates to an interaction process between service-oriented components and devices, wherein services offered by a service provider can be invoked by a service requester.

Ordinarily, in service oriented systems, particularly when the use of web services is being implemented, a service is a set of ports. Each port is an instance of a port type which defines a set of interaction operations and corresponding message transfers between the service provider and the service requester.

The object underlying the invention is to further improve upon an interaction process of the above-described type so as to simplify access and the interaction of heterogeneous communication models offered by the involved devices. Additionally, a deeper connection of services and their ports to physical ports of the device is to be achieved. In general, flexibility is to be expanded and the reconfiguration of the system simplified.

The object is attained according to the invention, i.a., in that each service comprises a set of ports and each port is an instance of a port type which defines a set of interaction operations and corresponding message transfers between the service provider and service requester, wherein the service provided by the service provider executes multiple interaction phases with the service requester and the interaction phases follow specific protocols that are linked to the instances of the port type, and wherein access to the service is generated through a sequence of different ports that are linked to the phases.

Thus, the invention provides a process for utilizing life cycles of services which are provided by service oriented devices and associated applications. The mechatronic devices which provide and request services are a part of a distributed control approach based upon service optimization at the plant level in automation and production systems.

The process is comprised of various phases which are involved in the interaction between service requesters and service providers, allowing the requester to utilize the services that are offered. Access to the various phases of a service is effected via its port. The service provider is a mechanism which provides services to outside users which can be used by service requesters. Both the requester and the provider are software applications, part of the communications module which is implemented in the service oriented device and supporting applications. A communications module can also incorporate both requester and provider in one instance, forming a client/server communications module.

According to a preferred process, a service provided by a component, such as a device, includes multiple interaction phases with its requesters, which phases must follow specific protocols which are linked to the instances of the port type, such as ports, for example.

Access to a service is generated by following a sequence of different ports, which are linked to the phases. The phases are:
Discovery phase: Ability to discover and register services, which utilize different processes described by their protocols.
Negotiation phase: If the operational phase is to be properly entered into, negotiation must take place between the service requester and the service provider.
Operational phase: Main ports are those which correspond to the operational phases (these provide the main resource and functionality of the service and the nucleus (core) of the requester interest). Logical ports for services can also correspond to physical ports of the provider device (such as a conveyor belt, for example), thereby providing a content-oriented (associative) perspective.
Completion phase: Final setup following the operational phase.

Interaction, in turn, is broken down into these four phases. One or more port types correspond to each phase, with the associated access protocol (access protocol) which defines the interaction rules. Access by the requester is implemented by the instances of the port types.

A further preferred procedure is characterized in that the ports can be set up dynamically from corresponding port types and access protocols, if necessary.

Further, the process is characterized by the ability to provide the same ports for the same functionality, but instantiated by different port type and protocol.

In particular, logical ports of the operational phase can be assigned directly to the physical ports of the device.

The goal of the invention is to provide the formalization of different phases of the use of a service which is provided by devices and port types/protocol mechanisms, in order to generate port instances for different phases.

The following topics summarize the initial advantages of applying this idea:
Definition of a shared life cycle for the utilization of a service which can be shared between devices, along with its logical interaction processes and behavior.
The availability of different protocols for the same functionality and the dynamic generation of ports simplifies access and the interaction of heterogeneous communication models which are offered by the involved devices.
Deeper connection of services and their ports to physical ports of the device.
Expanded flexibility and logical reconfiguration, which is required by distributed control systems.

Additional details, advantages and features of the invention are provided not only in the claims, the features to be found therein—alone or in combination—, but also in the following description of preferred exemplary embodiments found in the set of drawings.

The drawings show:
FIG. 1 a schematic representation of service interaction phases and their depiction in port types and port instances,
FIG. 2 a sequence diagram of the interaction phases of the services and
FIG. 3 the schematic representation of a transfer service of a bidirectional conveyor belt with associated ports.

FIG. 1 shows a four-phase interaction model based upon port type protocols. Access to a service is generated by following a sequence of different ports, such as discovery port, negotiation port, operational port and completion port, which are linked to phases, such as discovery phase, negotiation phase, operational phase and completion phase.

The discovery phase describes the ability to locate services which utilize different processes defined by their protocols.

The negotiation phase is designed for entering into the operational phase. A negotiation must take place between the service requester and the service provider.

The operational phase is linked to the operational port. The operational ports or main ports are those that correspond with the operational phases. These provide the main resources and functionality of the services which correspond to the requirements of the requester. Logical ports for the services can also correspond to physical ports of the provider device, such as a conveyor belt, for example, providing a content-oriented perspective.

This is ultimately followed by the completion phase, in which a final setup takes place after the operational phase.

As is shown in FIG. 1, interaction is broken down into four phases, wherein each phase represents one or more port types with the associated access protocol. Access to the service by the service requester is implemented by the instances of the port types.

In service oriented systems, interactions are generated by a request for existing services by a client who wishes to utilize these services and obviously to coordinate the process.

Figure 2:
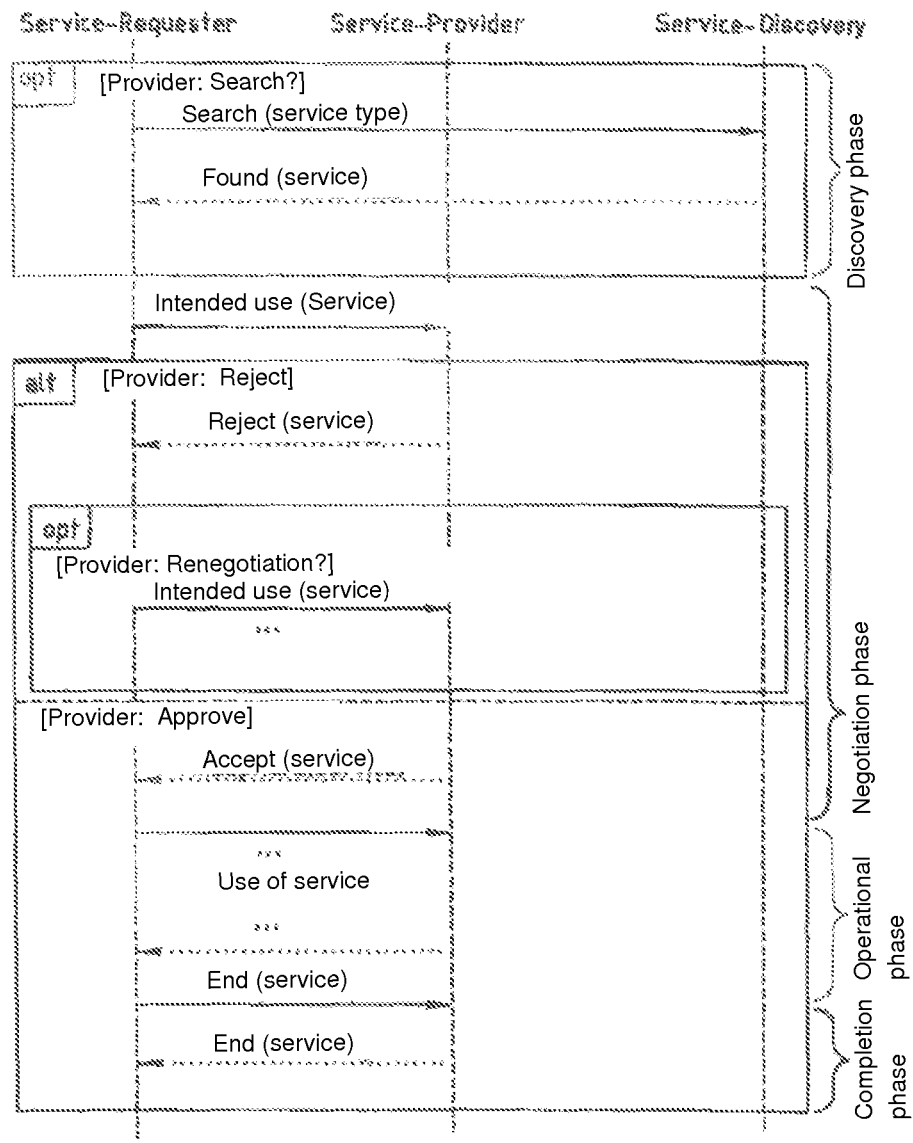

FIG. 2 shows a sequence diagram of the process of interacting with services using four phases.

The service discovery according to FIG. 2 can be any discovery mechanism for localizing services.

Before using the service, the service requester must search for a specific service that will meet his requirements. After an interface that will describe the service is set up, this interface can contact the service provider. Obviously, it must first make an offer to utilize the service. If this offer is not accepted, it can continue with a more complex negotiation with the service provider, if this is allowed.

Acceptance of the request or utilization of a service initiates the operational phase, in which the service will be utilized. In this phase it is important for the activities of the service requester and those of the service provider to be synchronized. After the operational phase, the completion phase can establish processes for finishing with utilization of a service.

Several additional features are also worthy of mention:
One important feature is that the ports can be set up dynamically using corresponding port types and access protocols, if necessary. If no operational port exists, but one is required for a specific request of a service, one can be generated for this situation, based upon a port type and an associated protocol.

The ability to provide the same ports for the same functionality, but instantiated by a different port type and protocol. For example, a requester can access only one service which utilizes a specific protocol, and others can require a completely different protocol to interact with the service. Ultimately, both require the same functionality for a given service.

Logical ports of the operational phase can be assigned directly to the physical ports of the device. For example, a conveyor belt with input and output ports provides a transfer service with logical operational ports which correspond to physical ports.

The process is applied to a mechatronic device corresponding to a bidirectional conveyor belt with four different ports PORT1, PORT2, PORTS and PORT4, by which pallets can be introduced and removed through physical ports as shown in FIG. 3. These ports are to be used for connection with other devices, such as other conveyor belts. In terms of the service, the conveyor belt provides a service which manages the operations necessary for carrying out transfer movements via the four logical ports (corresponding to the physical ports). This service must be requested for it to act in the corresponding manner. Requesters may be other conveyor belts which are connected to the first via ports. The service can be discovered and registered via a specific discovery port, such as transfer PORT1. Following discovery, the requester can continue with negotiation of the service, which includes simple models or interactions comprising more complex proposals. Once negotiation has been successfully completed, implementation of the services can be accessed via a specific operational port, such as transfer PORT1, which is queried. The example has four transfer ports, which are the instances of two different port types (transfer in/out) and associated access protocol. The result of the operation can include the final phase, which is controlled via the completion port.

The invention claimed is:

1. Interaction process between service-oriented components and devices, wherein services offered by a service provider are requested by a service requester, wherein each service comprises a set of ports and each port is an instance of an import type which defines a set of interaction operations and corresponding message transfers between the service provider and the service requester, wherein the service provided by the service provider is implemented through multiple interaction phases, namely discovery phase, negotiation phase, operational phase and completion phase with the service requester, each comprising at least one operational phase and wherein the interaction phases follow specific protocols linked to the instances of the port type, characterized in that one or more port types with the associated access protocol are assigned to each interaction phase, in that physical ports of the service-oriented device or the service-oriented component are assigned to the logical port types of the operational phase, and in that access to the service is generated via the port types that are linked to the physical ports.

2. Interaction process of claim 1, characterized in that access to the service by the service requester is carried out via the instances of the port types.

3. Interaction process of claim 1, characterized in that the ports can be set up dynamically using corresponding port types and access protocols.

4. Interaction process of claim 1, characterized in that ports are provided for the same functionality, but are instantiated by different port types and protocols.

5. Interaction process of at claim 1, characterized in that the service requester uses a service discovery for discovering and/or localizing a specific service.

* * * * *